US009697180B2

(12) United States Patent
Nordback (10) Patent No.: US 9,697,180 B2
(45) Date of Patent: Jul. 4, 2017

(54) SYSTEM AND METHOD FOR TEXT LAYOUT USING A PATH-FILL ALGORITHM (71) Applicant: Kurt N. Nordback, Boulder, CO (US)

(72) Inventor: Kurt N. Nordback, Boulder, CO (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 641 days.

(21) Appl. No.: 13/716,016

(22) Filed: Dec. 14, 2012

(65) Prior Publication Data
US 2013/0104036 A1   Apr. 25, 2013

Related U.S. Application Data (63) Continuation-in-part of application No. 12/911,256, filed on Oct. 25, 2010, now abandoned.

(51) Int. Cl.
G06F 17/00 (2006.01)
G06F 17/21 (2006.01)
G06T 11/20 (2006.01)
G06K 15/02 (2006.01)

(52) U.S. Cl.
CPC ........ G06F 17/211 (2013.01); G06K 15/1849 (2013.01); G06T 11/203 (2013.01)

(58) Field of Classification Search
CPC ....... G06F 17/211; G06T 11/001; G06T 11/40
See application file for complete search history.

(56) References Cited

U.S. PATENT DOCUMENTS

| 5,402,530 A | * | 3/1995 | Boenke | G06K 15/02 358/1.13 |
| 5,438,653 A | * | 8/1995 | Boenke | G06K 15/02 345/592 |
| 6,036,911 A | * | 3/2000 | Allison | B29C 67/0092 264/308 |
| 6,341,020 B1 | * | 1/2002 | Rumph | G06K 15/02 358/1.14 |

(Continued)

OTHER PUBLICATIONS

Alex; learncpp.com; 7.6 Function overloading; http://www.learncpp.com/cpp-tutorial/76-function-overloading/; 2007; 18 pages.*

(Continued)

Primary Examiner — Scott Baderman
Assistant Examiner — Benjamin J Smith
(74) Attorney, Agent, or Firm — Osha Liang LLP (57) ABSTRACT A method for placing a text string on a page includes obtaining an electronic document identifying a margin of the page, an exclusion region having a perimeter for placement on the page, a texture to fill the exclusion region, and the text string, calculating, using a path-fill algorithm inputting the perimeter, exclusion region geometric primitives, calculating, using the path-fill algorithm inputting a path based on the perimeter and the margin, text region geometric primitives, receiving the text string and the text region geometric primitives; calculating, for a line band crossing the page, segments corresponding to an intersection of the line band with the text region geometric primitives, rendering the page by filling the exclusion region geometric primitives with the texture, and placing the text string within the segments.

20 Claims, 5 Drawing Sheets

(56) References Cited

U.S. PATENT DOCUMENTS

| | | | | |
|---|---|---|---|---|
| 6,486,888 B1* | 11/2002 | Fushiki | | G06T 9/005 |
| | | | | 345/592 |
| 6,868,524 B1* | 3/2005 | Curtis | | G06F 17/211 |
| | | | | 345/467 |
| 6,903,742 B1* | 6/2005 | Fushiki | | G06T 11/203 |
| | | | | 345/443 |
| 7,315,979 B1* | 1/2008 | Walker | | G06T 11/60 |
| | | | | 358/1.1 |
| 7,408,553 B1* | 8/2008 | Toksvig | | G06T 11/40 |
| | | | | 345/423 |
| 7,423,659 B1* | 9/2008 | Pratley | | G06F 17/211 |
| | | | | 345/660 |
| 7,555,711 B2* | 6/2009 | Chao | | G06F 17/211 |
| | | | | 715/243 |
| 7,712,018 B2* | 5/2010 | Brown | | G06F 17/214 |
| | | | | 715/204 |
| 7,872,648 B2* | 1/2011 | Hoppe | | G06T 9/00 |
| | | | | 345/423 |
| 8,045,823 B2* | 10/2011 | Fushiki | | G06F 17/211 |
| | | | | 382/276 |
| 2004/0061874 A1* | 4/2004 | Ghose | | G06K 15/1828 |
| | | | | 358/1.2 |
| 2004/0109183 A1* | 6/2004 | Hawksworth | | H04N 1/58 |
| | | | | 358/1.9 |
| 2005/0138555 A1* | 6/2005 | Fushiki | | G06F 17/211 |
| | | | | 715/247 |
| 2005/0280847 A1* | 12/2005 | Cairns | | H04N 1/6011 |
| | | | | 358/1.9 |
| 2006/0005114 A1* | 1/2006 | Williamson | | G06F 17/2247 |
| | | | | 715/211 |
| 2008/0104509 A1* | 5/2008 | Walker | | G06T 11/60 |
| | | | | 715/276 |
| 2008/0238927 A1* | 10/2008 | Mansfield | | G06T 11/60 |
| | | | | 345/467 |
| 2008/0309676 A1* | 12/2008 | Nehab | | G06T 9/00 |
| | | | | 345/582 |
| 2009/0249393 A1* | 10/2009 | Shelton | | H04N 5/445 |
| | | | | 725/39 |
| 2010/0174732 A1* | 7/2010 | Levy | | G06F 17/211 |
| | | | | 707/768 |
| 2011/0285736 A1* | 11/2011 | Kilgard | | G06T 11/203 |
| | | | | 345/584 |
| 2011/0285740 A1* | 11/2011 | Kilgard | | G06T 11/203 |
| | | | | 345/589 |
| 2011/0285743 A1* | 11/2011 | Kilgard | | G06T 11/203 |
| | | | | 345/592 |
| 2011/0285747 A1* | 11/2011 | Kilgard | | G06T 11/203 |
| | | | | 345/613 |
| 2013/0076761 A1* | 3/2013 | Ellis | | G06F 15/16 |
| | | | | 345/502 |

OTHER PUBLICATIONS

Qt 4.8 Documentation; QPainterPath Class; http://doc.qt.io/qt-4.8/qpainterpath.html; 2010; 31 pages;.*

Qt 4.8 Documentation; QPainter Class; http://doc.qt.io/qt-4.8/qpainter.html; 2010; 31 pages;.*

* cited by examiner

SYSTEM AND METHOD FOR TEXT LAYOUT USING A PATH-FILL ALGORITHM

CROSS-REFERENCE TO RELATED APPLICATIONS

This application is a continuation-in-part of U.S. patent application Ser. No. 12/911,256 filed on Oct. 25, 2010, and entitled: "APPLICATION OF PATH-FILL ALGORITHMS TO TEXT LAYOUT AROUND OBJECTS." Accordingly, this application claims benefit of the filing date of U.S. patent application Ser. No. 12/911,256 under 35 U.S.C. §120. U.S. patent application Ser. No. 12/911,256 is hereby incorporated in its entirety.

BACKGROUND

Filling (with a color, for example) within a path on a 2-dimensional plane is a common problem in computer graphics, and algorithms for how to do it (i.e., path-fill algorithms) are common and well established.

In modern software applications, such as word processors and page-layout applications, it is possible to create pages with text tightly placed around another object such as an image or graphic. The text may wrap around all sides of the object. In such situations, it is necessary to maintain the integrity of words. Given that many such objects can be on a page, and that their shapes can be arbitrary, algorithms to determine how to lay out the text can be quite complex, and unlike path-fill algorithms, are uncommon and not established. This, in turn, means that the computer code and hardware to implement such an algorithm can be time-consuming and error-prone to write and to maintain.

SUMMARY OF INVENTION

In general, in one aspect, the invention relates to a method for placing a text string on a page. The method comprises obtaining an electronic document identifying a margin of the page, an exclusion region having a perimeter for placement on the page, a texture to fill the exclusion region, and the text string; calculating, using a path-fill algorithm inputting the perimeter, a first plurality of geometric primitives corresponding to the exclusion region; calculating, using the path-fill algorithm inputting a path based on the perimeter and the margin, a second plurality of geometric primitives corresponding to a text region on the page excluding the margin and the exclusion region; receiving, by a line extent interface, the text string and the second plurality of geometric primitives; calculating, by the line extent interface and for a first line band crossing the page, a first plurality of segments corresponding to an intersection of the first line band with the second plurality of geometric primitives; and rendering the page by: filling the first plurality of geometric primitives with the texture; and placing a first portion of the text string within the first plurality of segments.

In general, in one aspect, the invention relates to a non-transitory computer readable medium storing instructions for placing a text string on a page. The plurality of instructions comprises functionality to obtain an electronic document identifying a margin of the page, an exclusion region having a perimeter for placement on the page, a texture to fill the exclusion region, and the text string; calculate, using a path-fill algorithm inputting the perimeter, a first plurality of geometric primitives corresponding to the exclusion region; calculate, using the path-fill algorithm inputting a path based on the perimeter and the margin, a second plurality of geometric primitives corresponding to a text region on the page excluding the margin and the exclusion region; receive, by a line extent interface, the text string and the second plurality of geometric primitives; calculate, by the line extent interface and for a first line band crossing the page, a first plurality of segments corresponding to an intersection of the first line band with the second plurality of geometric primitives; and render the page by: filling the first plurality of geometric primitives with the texture; and placing a first portion of the text string within the first plurality of segments.

In general, in one aspect, the invention relates to a system for placing a text string on a page. The system comprises a processor configured to: obtain an electronic document identifying a margin of the page, an exclusion region having a perimeter for placement on the page, a texture to fill the exclusion region, and the text string; a path-fill module executing on the processor and configured to: calculate, using a path-fill algorithm inputting the perimeter, a first plurality of geometric primitives corresponding to the exclusion region; calculate, using the path-fill algorithm inputting a path based on the perimeter and the margin, a second plurality of geometric primitives corresponding to a text region on the page excluding the margin and the exclusion region; a line extent interface executing on the processor and configured to: receive the text string and the second plurality of geometric primitives; calculate, for a first line band crossing the page, a first plurality of segments corresponding to an intersection of the first line band with the second plurality of geometric primitives; and a placement module executing on the processor and configured to render the page by: filling the first plurality of geometric primitives with the texture; and placing a first portion of the text string within the first plurality of segments.

Other aspects and advantages of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for placing a text string on a page using a path-fill algorithm. Specifically, an electronic document identifying a margin, an exclusion region for placement on the page, the exclusion region having a perimeter, and a texture to fill the exclusion region, is obtained. Then, a path-fill algorithm is used to calculate geometric primitives for the exclusion region and a text region. Specifically, the same path-fill algorithm is used for both calculations, allowing for code-reuse and substantial cost and time savings. Next, a line extent interface receives the primitives associated with the text region and calculates segments where text may be placed in a line band crossing the page. Finally, the page is rendered by filling the geometric primitives of the exclusion region with the texture and placing portions of the text string within the segments calculated by the line extent interface.

Figure 1:
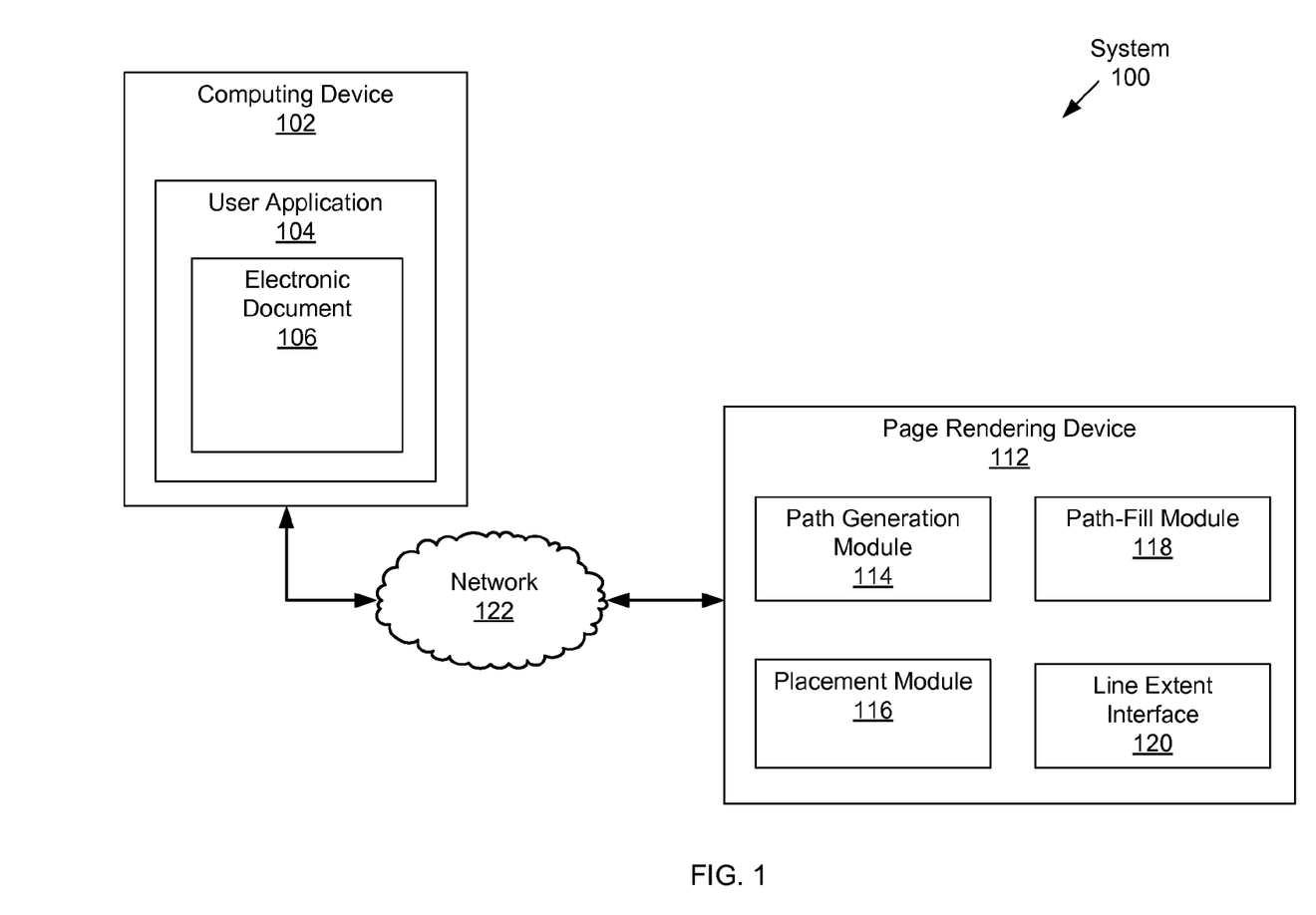
FIG. 1 shows a block diagram depicting a system in accordance with one or more embodiments of the invention.

FIG. 1 shows a system (100) in accordance with one or more embodiments of the invention. As shown in FIG. 1, the system (100) has multiple components including a page rendering device (112) and a computing device (102). The PRD (112) may be a printer, an electronic reader, etc. The computing device (102) may be a personal computer (PC), a desktop computer, a mainframe, a server, a telephone, a tablet computer, a kiosk, a cable box, a personal digital assistant (PDA), an electronic reader, a mobile phone, a smart phone, etc. There may be a direct connection (e.g., universal serial bus (USB) connection) between the computing device (102) and the PRD (112). Alternatively, the computing device (102) and the PRD (112) may be connected using a network (122) having wired and/or wireless segments.

In one or more embodiments of the invention, the PRD (112) is located on the computing device (102). In such embodiments, the PRD (112) may correspond to any combination of hardware and software on the computing device (102) for rendering the ED.

In one or more embodiments of the invention, the computing device (102) executes the user application (104). The user application (104) is a software application operated by a user and configured to obtain, input, generate, display, and/or print an ED (e.g., Electronic Document (106)) having any number of pages. Accordingly, the user application (104) may be a word-processing application, a spreadsheet application, a desktop publishing application, a graphics application, a photograph printing application, an Internet browser, etc. The user application (104) may generate new EDs and/or obtain previously saved EDs.

In one or more embodiments of the invention, each page of the ED (106) includes one or more text strings (e.g., a title, a subheading, a paragraph, a single sentence, a single word, a signature block, etc.) and/or zero or more exclusion regions. In one or more embodiments of the invention, the ED (106) may identify a texture with which to fill an exclusion region. The texture may be anything including, but not limited to: a solid color, a tiled pattern, clipart, a scanned image, etc. In general, the term "exclusion region" applies to any area of the page where text cannot be placed because the area is occupied by the texture. Accordingly, the ED (106) may specify the margins of a page, the vertical positions (i.e., coordinates) of text lines on the page (explicitly or, more commonly, implicitly), the font type, font style, font size of the text, etc. Similarly, the ED (106) may specify the positions (i.e., coordinates) of the exclusion regions, the dimensions of the exclusion regions (i.e., height, width), etc. The ED (106) may specify the positions of the exclusion regions relative to the page, relative to some marker in the text, relative to a text structure such as a paragraph or (for horizontal positioning) a column, or in other fashions which depend on the particular layout of the text.

In one or more embodiments of the invention, the ED (106) is represented/defined using a document markup language (e.g., ODF, OOXML, HTML, etc.). Accordingly, the properties/attributes of the pages, the text lines, and the exclusion regions (i.e., positions, perimeters, dimensions, font sizes, font styles, margins, etc.) in the ED (106) may be recorded as attributes within the tags of the document markup language. Moreover, these properties/attributes are needed to correctly render the ED (106) for display or printing.

In one or more embodiments of the invention, the PRD (112) includes a path generation module (114). The path generation module (114) is configured to define a path (i.e., vector path) on a page of the ED (106). The path will generally include an outer closed subpath corresponding to the margins of the page (i.e., margin subpath), plus zero or more closed subpaths corresponding to the exclusion regions of the page (i.e., exclusion region subpaths). In one or more embodiments of the invention, the margin subpath and the one or more exclusion region subpaths are rectangular in shape. Alternatively, the margin subpath and the one or more exclusion region subpaths may be any shape. The multiple exclusion regions need not be disjoint and need not be contained by the margin subpath. In one or more embodiments of the invention, the margin subpath and the exclusion region subpath(s) are assigned opposite directions. For example, the margin subpath may be assigned the counterclockwise direction, while the one or more exclusion region subpaths may be assigned the clockwise direction.

In one or more embodiments of the invention, the PRD (112) includes a path-fill module (118). The path-fill module (118) executes a path-fill algorithm configured to input a path or a perimeter of a region, and output geometric primitives (e.g., rectangles, triangles, etc.) corresponding to the region In other words, the path-fill algorithm takes a (potentially) complicated shape and reduces it into a set of geometrically primitive shapes.

In one or more embodiments of the invention, the path-fill module (118) is also configured to input a fill rule. The set of geometric primitives outputted by the path-fill algorithm is dependent on the fill rule. For example, the fill rule may correspond to the set of points on the page having a counterclockwise winding number of +1. Those skilled in the art, having the benefit of this detailed description, will appreciate that the fill rule and/or directions assigned to the paths/perimeters may need to be modified/converted depending on the path-fill algorithm being used.

In one or more embodiments of the invention, line extent interface (120) calculates segments on the page where text may be placed. Specifically, for a given line band crossing the page, the segments correspond to the intersection of the line band and the geometric primitives generated by the path-fill module (118). In one or more embodiments of the invention, the intersection of the line band and the primitives is the same (or very close) to the intersection of the line band and the path. The line segments have the same height and/or width as the line band.

In one or more embodiments of the invention, in the case of Western languages, the line band corresponds to a horizontal strip having a height based on the text height in the text string. The height of the line band may be based on or calculated from additional attributes explicitly or implicitly disclosed in the ED (106). The line band is placed at a vertical location on the page. Accordingly, the vertical position may be below the top margin, or below the previous text line placed on the page, or at any location specified or calculated from the ED (106).

Alternatively, in the case of vertical text layout (e.g., for certain Eastern languages), the line band may correspond to a vertical strip having a width based on the character widths in the text string. The width of the line band may be based on or calculated from additional attributes explicitly or implicitly disclosed in the ED (106). The line band is placed at a horizontal location on the page. Accordingly, the horizontal position may be adjacent to the margin, or adjacent to the previous text line placed on the page, or at any location specified or calculated from the ED (106).

In one or more embodiments of the invention, the PRD (112) includes a placement module (116). The placement module (116) is configured to render the page by taking the outputs of path-fill module (118) and/or line extent interface (120), filling in any exclusion regions (represented as geometric primitives) with their associated textures, and placing text within the multiple segments identified by line extent interface (120). In one or more embodiments of the invention, placing the text within the multiple segments requires partitioning the text line according to language rules (e.g., line breaking, hyphenation rules, etc.).

Figure 2:
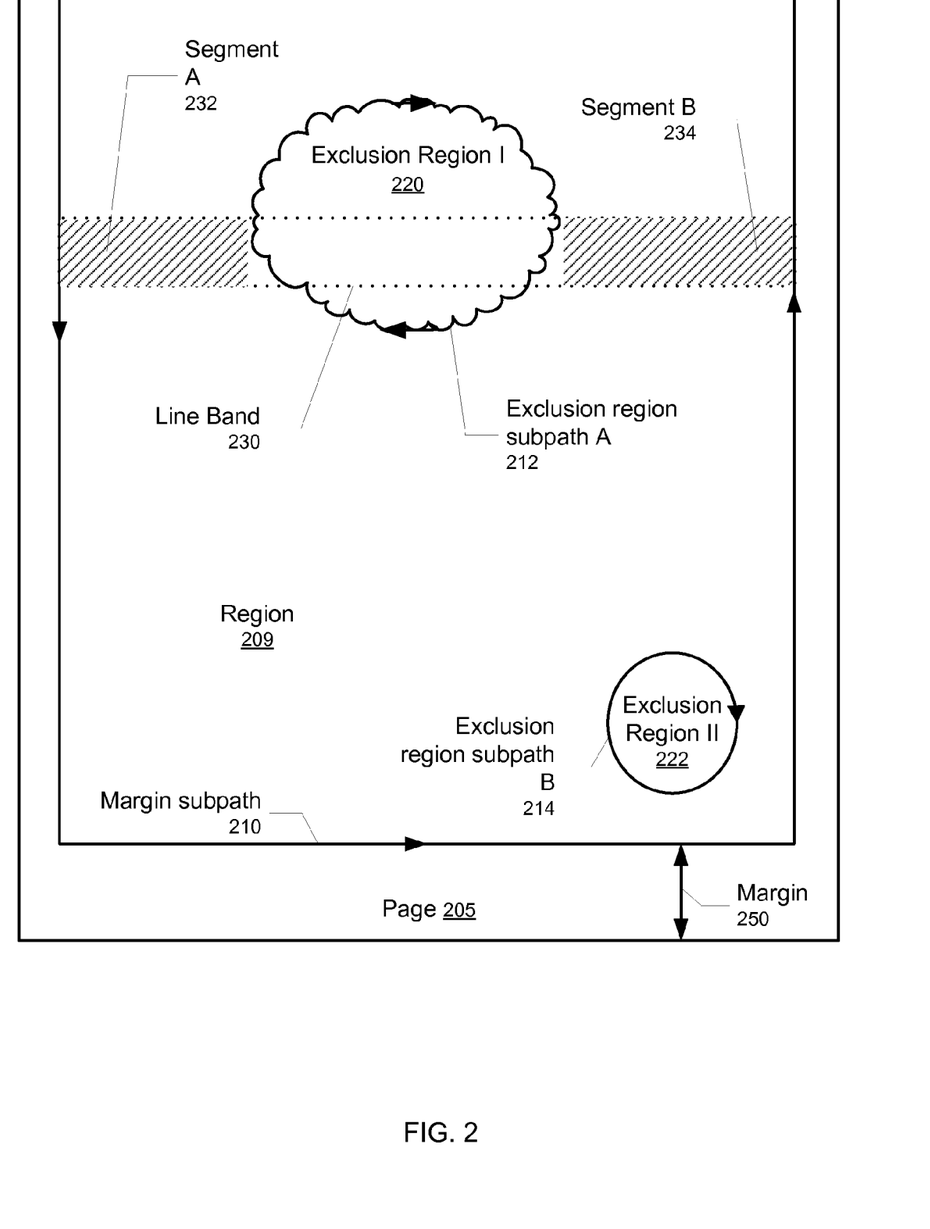
FIG. 2 shows a page in accordance with one or more embodiments of the invention.

FIG. 2 shows a page (205) in accordance with one or more embodiments of the invention. As shown in FIG. 2, the page (205) includes a margin subpath (210) corresponding to the margin (250) of the page (205). The page (205) also includes multiple exclusion region subpaths (i.e., Exclusion Region Subpath A (212), Exclusion Region Subpath B (214), etc.) corresponding to multiple exclusion regions (i.e., Exclusion Region I (220), Exclusion Region II (222)) on the page (205). The vector path for the page (205) includes the margin subpath (210) and the multiple exclusion region subpaths (212, 214). As discussed above, each exclusion region (220, 222) corresponds to an area on the page of any shape where text cannot be placed because the area is to be filled by a texture. As also discussed above, the margin subpath (210) and the exclusion region subpaths (212, 214) are assigned different directions (i.e., counterclockwise, clockwise, etc.).

In one or more embodiments of the invention, the text region (209) is calculated by the path-fill module (118) and corresponds to the portion of the page (205), where text can be placed. The text region (209) may correspond to points having a winding number of +1 with respect to the vector path for the page (205).

FIG. 2 also shows line band (230), segment A (232), and segment B (234). Line band (230) as discussed above, is a horizontal line crossing the page (205). The intersection of line band (230) with the text region (209) corresponds to the segments (232, 234) where text could be placed.

Figure 3:
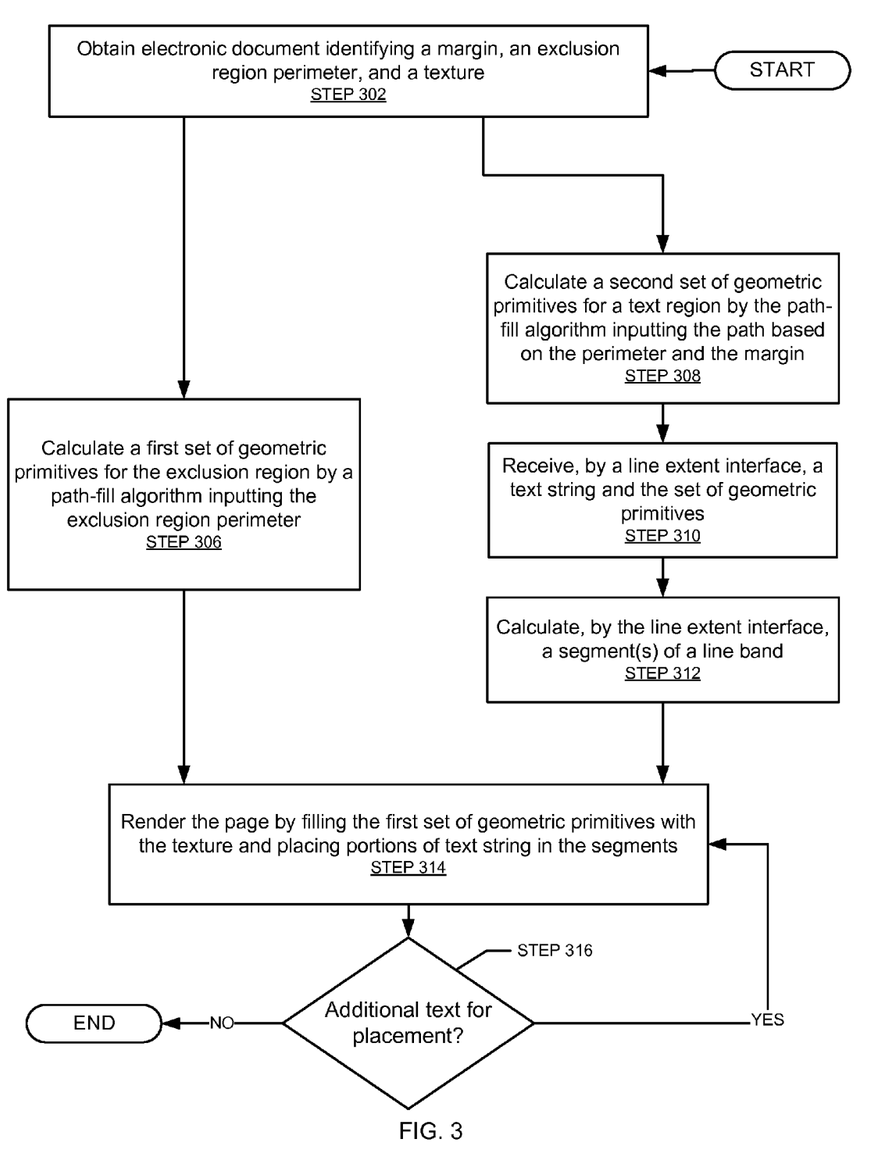
FIG. 3 shows a flowchart in accordance with one or more embodiments of the invention.

FIG. 3 shows a flowchart describing a process for placing a text string on a page in accordance with one or more embodiments of the invention. The process depicted in FIG. 3 may be implemented using the system (100), described above in reference to FIG. 1. One or more steps shown in FIG. 3 may be omitted, repeated, and/or performed in a different order among different embodiments of the invention. Accordingly, embodiments of the invention should not be considered limited to the specific number and arrangement of steps shown in FIG. 3.

In STEP 302, an ED is obtained in accordance with one or more embodiments of the invention. The ED identifies a margin of a page, a perimeter of an exclusion region to be placed on the page, and a texture to fill the exclusion region. The exclusion region is an area where text cannot be placed, because the exclusion region will be filled with the texture. The texture may be a solid color, a pattern, clipart, etc. The ED may also specify the text string(s) for placement on the page, or the text string(s) may be obtained in a subsequent step. In one or more embodiments of the invention, the ED may be represented/defined using a document markup language (e.g., ODF, OOXML, etc.). Accordingly, the properties (i.e., attributes) of the pages, the text strings, and the exclusion regions (i.e., positions, perimeter, dimensions, font sizes, font styles, margins, etc.) in the ED may be recorded as attributes within the tags of the document markup language.

In STEP 306, a first set of geometric primitives corresponding to the exclusion region is calculated by a path-fill algorithm, in accordance with one or more embodiments of the invention. The path-fill algorithm inputs the perimeter of the exclusion region in order to calculate the first set of geometric primitives. The first set of geometric primitives may include rectangles, triangles, and trapezoids.

In STEP 308, a second set of geometric primitives corresponding to the text region is calculated using the same path-fill algorithm, in accordance with one or more embodiments of the invention. The path-fill algorithm inputs a fill rule and a vector path based on the margin and the perimeter of the exclusion region. For example, the fill rule may correspond to the set of points on the page having a winding number of +1.

In STEP 310, a text string and the second set of geometric primitives are received by a line extent interface, in accordance with one or more embodiments of the invention. The text string may be extracted from the electronic document, obtained from an input device, or obtained from any other suitable source. In one or more embodiments of the invention, the text string may include a text height. The text height may take the form of a font size, a specific pixel height, a formula varying the text height based on any suitable variable, etc. The second set of geometric primitives and the text string may be received in any method now known or later developed.

In STEP 312, one or more segments on the page are calculated. The segments correspond to places on the page where text may be places. Specifically, for a given line band crossing the page, the line segments correspond to the intersection of the line band and the second set of geometric primitives. The line segments have the same height and/or width as the line band.

Those skilled in the art, having the benefit of this detailed description, will appreciate that when the line band crosses one or more exclusion regions, it is likely that the intersection operation will produce multiple segments (i.e., segments on both sides of the exclusion region(s)). Similarly, when the line band does not cross any exclusion regions, it is likely that the intersection operation will produce only one segment spanning the page inside the margins. The line band may be identified in any suitable manner. In one or more embodiments of the invention, the line band has a dimension (e.g., height and/or width) matching a corresponding text size. For example, in the case of a horizontal line band, the height of the horizontal line band corresponds to the height of the text characters. Different line bands may have different text heights. In the case of a vertical line band, the width of the vertical line band corresponds to the width of the text characters. Further, the position of the horizontal/vertical line band on the page corresponds to the vertical/horizontal position of the text line on the page. For example, the position may be below/adjacent to a margin of the page, or below/adjacent to a previously placed text line, or at any position specified by the ED. In one or more embodiments of the invention, STEP 312 may be repeated as many times as necessary to identify/calculate all segments where text may be placed.

As shown in FIG. 3, STEP 306 may be executed in parallel with STEP 308, STEP 310, and STEP 312. In one or more embodiments of the invention, STEP 306 is executed before or after one or more of STEPS 308, 310, and 312.

In STEP 314, the page is rendered by filling the first set of geometric primitives with the texture and placing different portions of the text string into different segments, in accordance with one or more embodiments of the invention. The text string may be partitioned into different portions according to rules for line-breaking, hyphenation, etc. The rules are dependent on, and thus will vary with, the language of the text and parameters specified in the ED. STEPS 312 and 314 may be performed as many times as necessary to place all of the text strings onto the page.

In STEP 316, it is determined whether the ED has additional text for placement on the page. When it is determined that the ED has additional text for placement on the page, the process returns to STEP 314. When it is determined that all of the text has been placed, the process ends.

Figure 4:
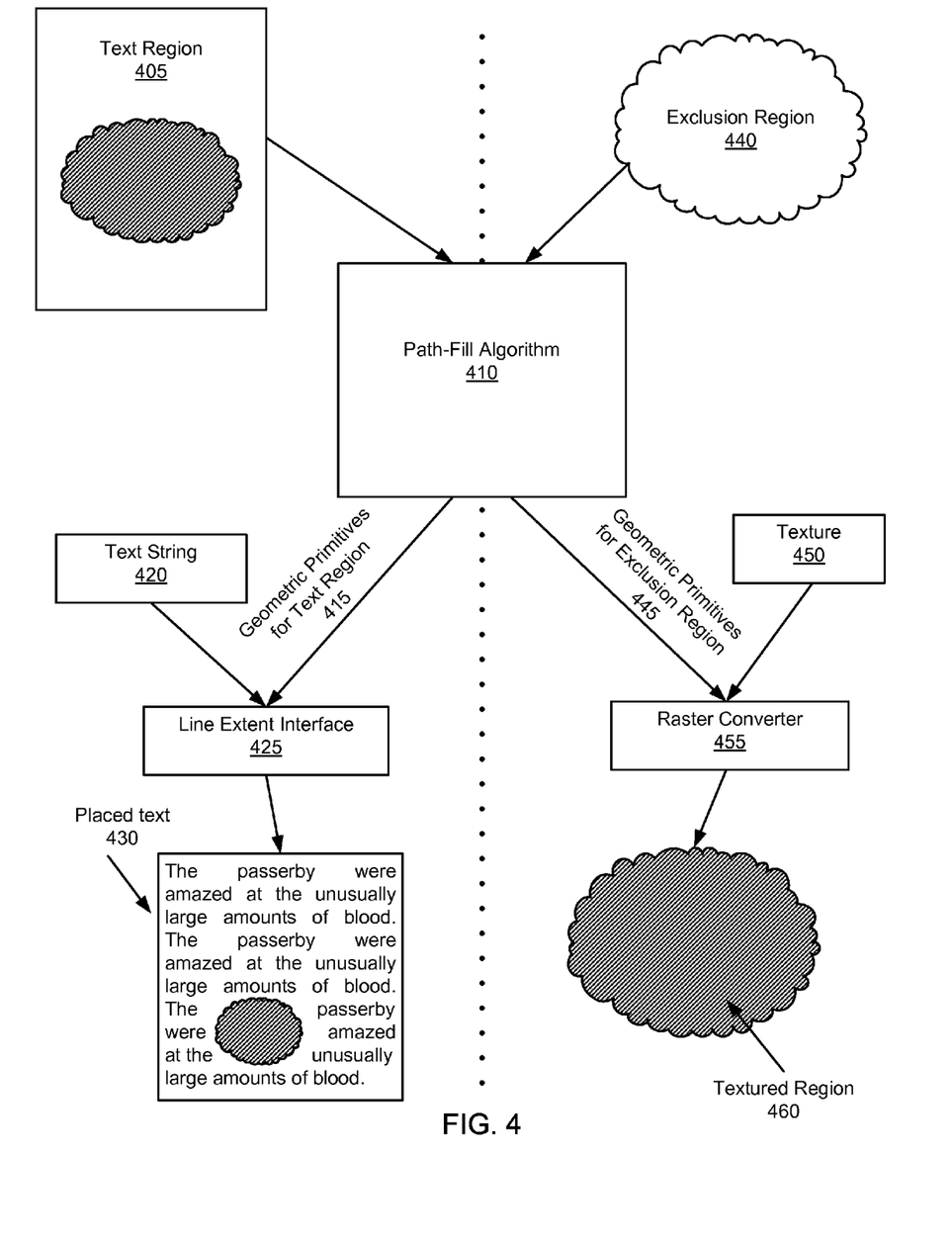
FIG. 4 shows an example in accordance with one or more embodiments of the invention.

FIG. 4 shows an example in accordance with one or more embodiments of the invention. Specifically, FIG. 4 shows an example of the same path-filling algorithm being used for both the calculation of geometric primitives corresponding to the exclusion regions of a page; and the calculation of geometric primitives corresponding to the text region. On the right hand side of FIG. 4, the path-fill algorithm is used to calculate geometric primitives for an exclusion region. While on the left hand side of FIG. 4, the path-fill algorithm is being used to calculate geometric primitives for a text region. The reuse (e.g., code reuse) of the same path-fill algorithm for both text layout and graphic layout results in substantial time and money savings.

On the left hand side of FIG. 4, a path based on a margin of the page and the perimeter of the exclusion region (440) is inputted into the path-fill algorithm (410). A fill rule is also inputted into the path-fill algorithm (410). The path-fill algorithm generates a set of geometric primitives corresponding to a text region (405) on the page. The geometric primitives generated represent, using many simple shapes, the shape of text region (405). Path-fill algorithm (410) may generate the geometric primitives in any method now known or later developed, and any number of geometric primitives may be generated. Further, the geometric primitives may be of any shape.

The generated geometric primitives for the text region (415) are sent to line extent interface (425). Text string (420) is also sent to line extent interface (425). Geometric primitives for text region (415) and text string (420) may be sent to line extent interface (425) in any method now known or later developed. Text string (420) is text for placement on the page, and may be obtained from the electronic document or other suitable source. Once line extent interface (425) has received the geometric primitives for the text region (415) generated by path-fill algorithm (410) and text string (420), segments where text may be placed within a given line band are calculated. The segments are calculated by determining the intersection of the given line band and the geometric primitives for the text region (415). The line extent interface (425) may repeat the calculation as many times as necessary to identify all the segments where text may be placed for multiple line bands.

The right side of FIG. 4 begins with exclusion region (440), which is an area where text is not allowed to be placed. The perimeter of the exclusion region (440) is obtained from an ED. The ED also identifies a texture (450) to fill the exclusion region (440). The perimeter of the exclusion region (440) is an input to the path-fill algorithm (410). Path-fill algorithm (410) then calculates a set of geometric primitives corresponding to the shape of exclusion region (440), just as the algorithm did for text region (405). The reuse (i.e., code reuse) of path-fill algorithm (410) for both text-layouts and graphics results in substantial savings of programmer time and development costs.

The geometric primitives for the exclusion region (445) and texture (450) are then sent to raster converter (455). As mentioned previously, texture (450) is what exclusion region (440) will be filled with, such as a color, pattern, graphic, photo, etc. Raster converter (455) may be any raster converter now known or later developed. Raster converter (455) outputs the exclusion region filled with the associated texture (i.e., textured region (460)).

Embodiments of the invention have one or more of the following advantages: the ability to solve a text-layout problem by viewing it as a path-fill problem; the ability to lay out text tightly around another object such as an image or graphic using a known path-fill algorithm; the ability to avoid use of error-prone custom algorithms in determining how to lay out text around objects having arbitrary shapes; the ability to reuse the code of well-known path-fill algorithms for text-layout, thereby saving substantial time, money, and effort, etc.

Figure 5:
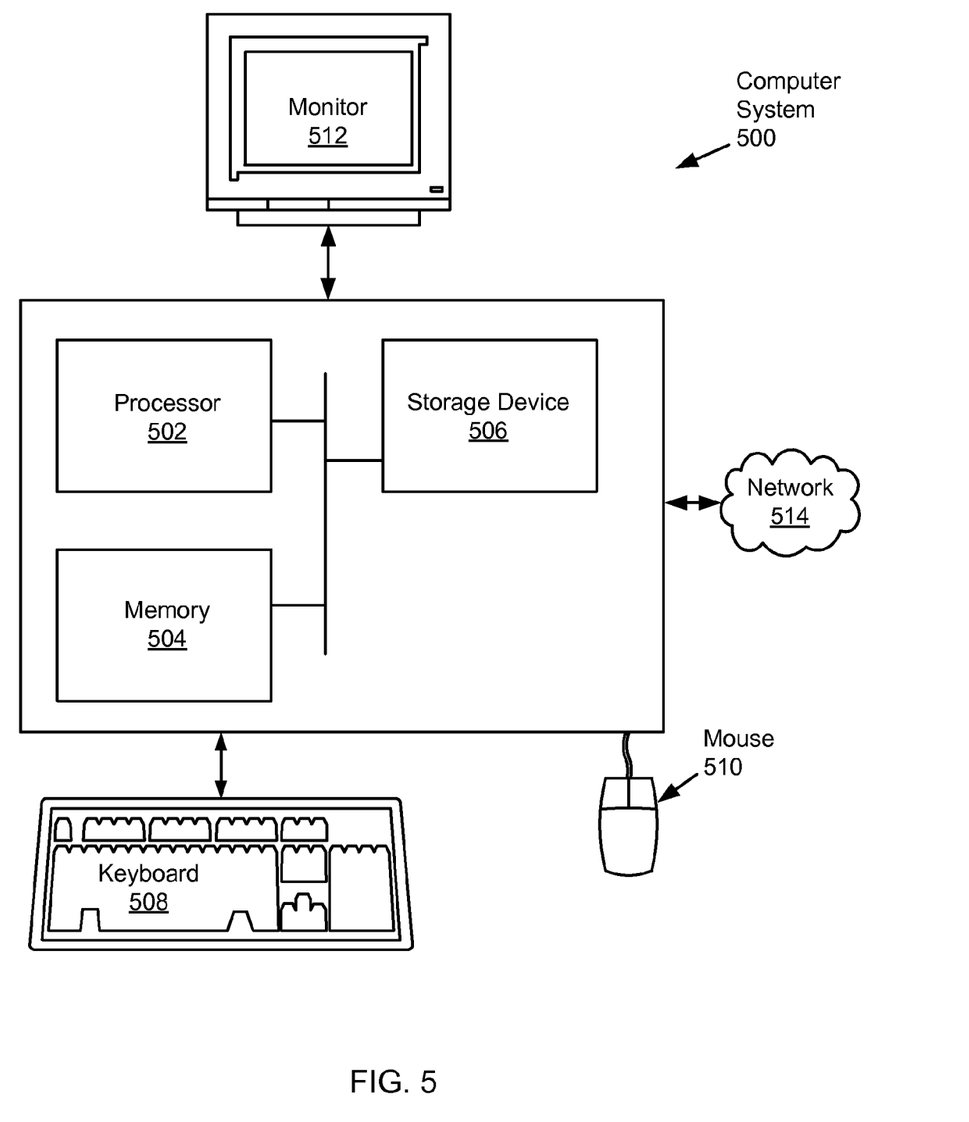
FIG. 5 shows a computer system in accordance with one or more embodiments of the invention.

Embodiments of the invention may be implemented on virtually any type of computer regardless of the platform being used. For example, as shown in FIG. 5, computer system (500) includes one or more processor(s) (502), associated memory (504) (e.g. random access memory (RAM), cache memory, flash memory, etc.), storage device (506) (e.g. a hard disk, an optical drive such as a compact disk drive or digital video disk (DVD) drive, a flash memory stick, etc.), and numerous other elements and functionalities typical of today's computers (not shown). In one or more embodiments of the invention, processor (502) is hardware. For example, the processor may be an integrated circuit. Computer system (500) may also include input means, such as keyboard (508), mouse (510), or a microphone (not shown). Further, computer system (500) may include output means, such as monitor (512) (e.g. a liquid crystal display (LCD), a plasma display, or cathode ray tube (CRT) monitor). Computer system (500) may be connected to network (514) (e.g. a local area network (LAN), a wide area network (WAN) such as the Internet, or any other type of network) via a network interface connection (not shown). In one or more embodiments of the invention, many different types of computer systems exist, and the aforementioned input and output means may take other forms. Generally speaking, computer system (500) includes at least the minimal processing, input, and/or output means necessary to practice embodiments of the invention.

Further, in one or more embodiments of the invention, one or more elements of the aforementioned computer system (500) may be located at a remote location and connected to the other elements over a network. Further, embodiments of the invention may be implemented on a distributed system having a plurality of nodes, where each portion of the invention (e.g. data structure, converter module, layout engine) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, punch cards, a tape, memory, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for placing a text string on a page, comprising:
   obtaining an electronic document specifying a margin of the page, an exclusion region having a perimeter for placement on the page, a texture to fill the exclusion region, and the text string;
   calculating, by a path-fill algorithm and based on the perimeter, a first plurality of geometric primitives corresponding to the exclusion region,
     wherein the perimeter is an input to the path-fill algorithm, and
     wherein the first plurality of geometric primitives is an output of the path-fill algorithm;
   defining a vector path comprising:
     a closed margin subpath corresponding to the margin and having a first direction; and
     a closed exclusion region subpath corresponding to the perimeter of the exclusion region and having a second direction that is opposite the first direction,
       wherein the closed exclusion region subpath is contained within the closed margin subpath;
   calculating, by the same path-fill algorithm and based on a winding number and the vector path associated with the perimeter and the margin, a second plurality of geometric primitives corresponding to a text region on the page excluding the margin and the exclusion region,
     wherein the vector path and the winding number are inputs to the path-fill algorithm, and
     wherein the second plurality of geometric primitives is an output of the path-fill algorithm;
   receiving, by a line extent interface, the text string and the second plurality of geometric primitives;
   calculating, by the line extent interface and for a first line band crossing the page, a first plurality of segments corresponding to an intersection of the first line band with the second plurality of geometric primitives; and
   rendering the page by:
     filling the first plurality of geometric primitives with the texture; and
     placing a first portion of the text string within the first plurality of segments.

2. The method of claim 1, further comprising:
   calculating, by the line extent interface and for a second line band crossing the page, a second plurality of segments corresponding to an intersection of the second line band with the second plurality of geometric primitives; and
   placing a second portion of the text string within the second plurality of segments.

3. The method of claim 2, wherein the first line band comprises a first text height.

4. The method of claim 3, wherein the second line band comprises a second text height, and wherein the first text height and second text height are different.

5. The method of claim 1, wherein the first line band is horizontal.

6. The method of claim 1, wherein the texture is a tiled pattern.

7. The method of claim 1, wherein the first line band crosses the exclusion region.

8. A non-transitory computer-readable medium (CRM) storing a plurality of instructions for placing a text string on a page, the plurality of instructions comprising functionality to:
   obtain an electronic document specifying a margin of the page, an exclusion region having a perimeter for placement on the page, a texture to fill the exclusion region, and the text string;
   calculate, by a path-fill algorithm and based on the perimeter, a first plurality of geometric primitives corresponding to the exclusion region,
     wherein the perimeter is an input to the path-fill algorithm, and
     wherein the first plurality of geometric primitives is an output of the path-fill algorithm;
   define a vector path comprising:
     a closed margin subpath corresponding to the margin and having a first direction; and
     a closed exclusion region subpath corresponding to the perimeter of the exclusion region and having a second direction that is opposite the first direction,
       wherein the closed exclusion region subpath is contained within the closed margin subpath;
   calculate, by the same path-fill algorithm and based on a winding number and the vector path associated with the perimeter and the margin, a second plurality of geometric primitives corresponding to a text region on the page excluding the margin and the exclusion region,
     wherein the vector path and the winding number are inputs to the path-fill algorithm, and
     wherein the second plurality of geometric primitives is an output of the path-fill algorithm;
   receive, by a line extent interface, the text string and the second plurality of geometric primitives;
   calculate, by the line extent interface and for a first line band crossing the page, a first plurality of segments corresponding to an intersection of the first line band with the second plurality of geometric primitives; and
   render the page by:
     filling the first plurality of geometric primitives with the texture; and
     placing a first portion of the text string within the first plurality of segments.

9. The non-transitory CRM of claim 8, the instructions further comprising functionality to:
   calculate, by the line extent interface and for a second line band crossing the page, a second plurality of segments corresponding to an intersection of the second line band with the second plurality of geometric primitives; and
   place a second portion of the text string within the second plurality of segments.

10. The non-transitory CRM of claim 9, wherein the first line band comprises a first text height.

11. The non-transitory CRM of claim 10, wherein the second line band comprises a second text height, and wherein the first text height and second text height are different.

12. The non-transitory CRM of claim 8, wherein the first line band is horizontal.

13. The non-transitory CRM of claim 8, wherein the texture is a tiled pattern.

14. The non-transitory CRM of claim 8, wherein the first line band crosses the exclusion region.

15. A system for placing a text string on a page, comprising:
- a memory; and
- a processor that is connected to the memory and that:
  - obtains an electronic document specifying a margin of the page, an exclusion region having a perimeter for placement on the page, a texture to fill the exclusion region, and the text string;
  - calculates, by a path-fill algorithm and based on the perimeter, a first plurality of geometric primitives corresponding to the exclusion region,
    - wherein the perimeter is an input to the path-fill algorithm; and
    - wherein the first plurality of geometric primitives is an output of the path-fill algorithm; and
  - defines a vector path comprising:
    - a closed margin subpath corresponding to the margin and having a first direction; and
    - a closed exclusion region subpath corresponding to the perimeter of the exclusion region and having a second direction that is opposite the first direction,
    - wherein the closed exclusion region subpath is contained within the closed margin subpath;
  - calculates, by the same path-fill algorithm and based on a winding number and the vector path associated with the perimeter and the margin, a second plurality of geometric primitives corresponding to a text region on the page excluding the margin and the exclusion region,
    - wherein the vector path and the winding number are inputs to the path-fill algorithm, and
    - wherein the second plurality of geometric primitives is an output of the path-fill algorithm;
  - receives the text string and the second plurality of geometric primitives; and
  - calculates, for a first line band crossing the page, a first plurality of segments corresponding to an intersection of the first line band with the second plurality of geometric primitives; and
  - renders the page by:
    - filling the first plurality of geometric primitives with the texture; and
    - placing a first portion of the text string within the first plurality of segments.

16. The system of claim 15, wherein the line processor also:
- calculates, for a second line band crossing the page, a second plurality of segments corresponding to an intersection of the second line band with the second plurality of geometric primitives.

17. The system of claim 16, wherein the processor also:
- places a second portion of the text string within the second plurality of segments.

18. The system of claim 17, wherein the first line band comprises a first text height, wherein the second line band comprises a second text height, and wherein the first text height and second text height are different.

19. The system of claim 15, wherein the first line band is horizontal.

20. The system of claim 15, wherein the texture is a tiled pattern.

* * * * *